(No Model.)
C. W. PROCTOR.
MEASURING VESSEL.
No. 450,494. Patented Apr. 14, 1891.
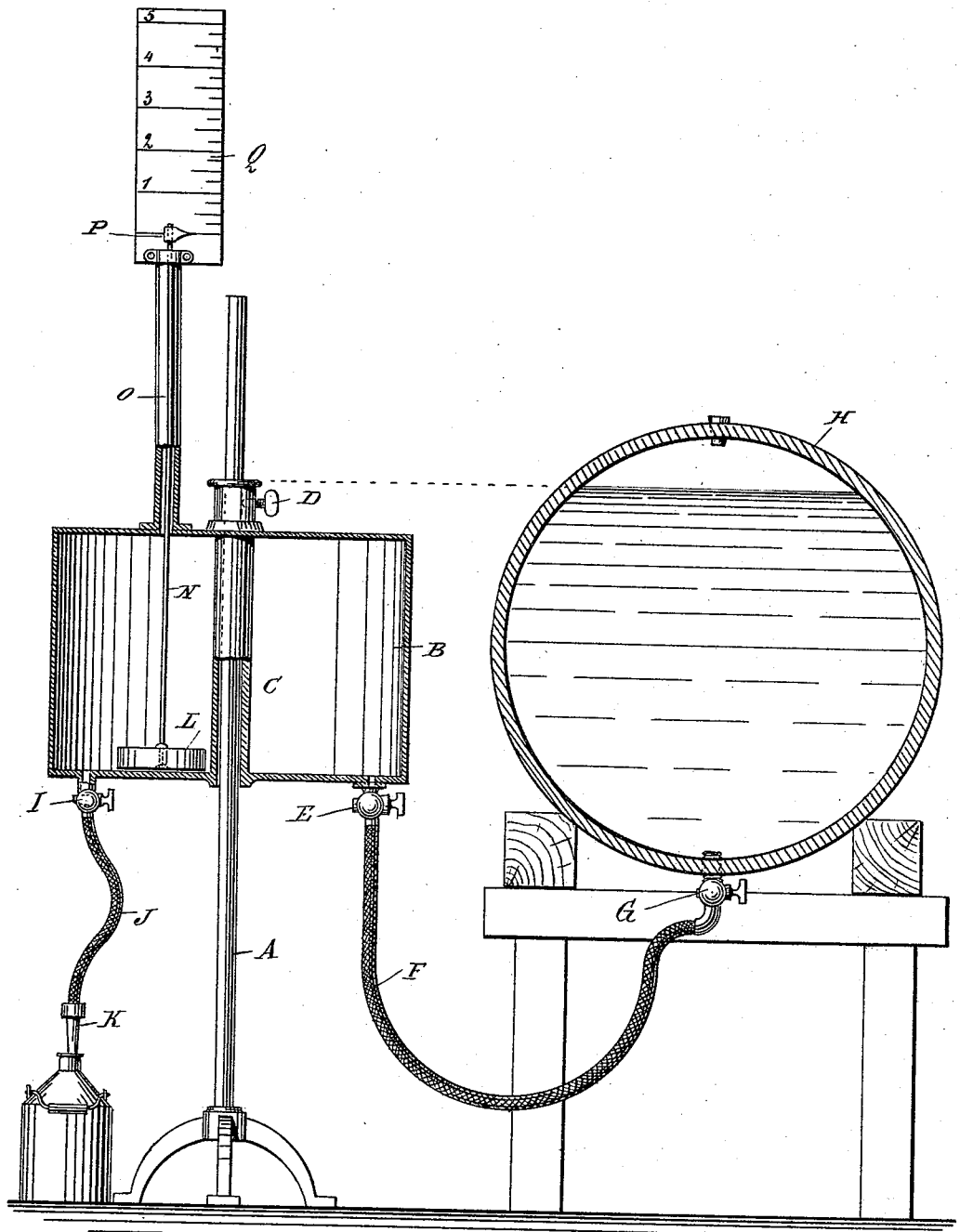
WITNESSES:
Chas. Nida.
C. Sedgwick
INVENTOR:
C. W. Proctor
BY Munn & Co.
ATTORNEYS

UNITED STATES PATENT OFFICE.

CHARLES W. PROCTOR, OF LAKE FOREST, ILLINOIS.

MEASURING-VESSEL.

SPECIFICATION forming part of Letters Patent No. 450,494, dated April 14, 1891.

Application filed January 26, 1891. Serial No. 379,124. (No model.)

*To all whom it may concern:*

Be it known that I, CHARLES W. PROCTOR, of Lake Forest, in the county of Lake and State of Illinois, have invented a new and Improved Liquid-Measuring Device, of which the following is a full, clear, and exact description.

The object of the invention is to provide a new and improved device designed for measuring oils and other liquids contained in a barrel or tank, the device being very simple and durable in construction, readily connected with the tank or barrel, and requiring no pump.

The invention consists of a vessel held vertically adjustable and provided with a float adapted to indicate on a scale.

The invention also consists of certain parts and details and combinations of the same, as will be hereinafter fully described, and then pointed out in the claims.

Reference is to be had to the accompanying drawing, forming a part of this specification, in which the figure is a sectional side elevation of the improvement as applied.

The improved liquid-measuring device is provided with a suitable portable post A, on which is fitted to slide vertically a vessel B, provided centrally with a sleeve C, passing through the top and bottom of the vessel B, and through which sleeve also passes the post A. In one outer end of the sleeve C is held a set-screw D for fastening the said sleeve, consequently the vessel B, to the post A at any desired height.

In the bottom of the vessel B is arranged a faucet E, connected by a flexible tube F of suitable length with a faucet G, held in the barrel or tank H, containing the liquid to be withdrawn and measured. The tank or barrel H may be any desired distance away from the measuring device, the tube F being correspondingly long. Thus the tank or barrel may, for instance, be placed outside of a house or store, while the measuring device is located in a room or in the store to be at any time within convenient reach of operator.

In the bottom of the vessel B is secured an outlet-faucet I, connected with a flexible tube J, provided with a nozzle K, adapted to discharge into an oil-can or other suitable receptacle to hold the liquid after being measured.

Within the vessel B is arranged a float L, provided with an upwardly-extending rod N, fitted to slide in a sleeve O, secured on the top of the vessel B.

On the outer end of the rod N is secured a pointer P, adapted to indicate on a scale Q, secured on the upper end of the sleeve O and indicating gallons and subdivisions or other liquid measurements. The graduation of the scale Q is relative to the cubic contents of the vessel B, so that when the float L rests on the bottom of the vessel B, as shown in the drawing, the pointer P stands at zero on the scale Q. When the vessel B fills with liquid, then the float rises and the amount of liquid within the vessel B is indicated on the graduation of the scale Q.

The device is used as follows: When the barrel or tank H has been set up, it is connected by the faucet G and tube F with the faucet E, and the vessel B is adjusted on the post A, so that its uppermost end is somewhat below the level of the liquid in the tank H. Now when the operator desires to withdraw a certain quantity of the liquid from the tank H he closes the faucet I, opens the faucets E and G, (the latter may be left open all the time, if desired,) so that the liquid from the barrel or tank H flows through the faucet G, the tube F, and faucet E into the vessel B. The liquid rising in the vessel B causes the float L to rise, and by its pointer P indicates on the graduation of the scale Q the amount of liquid which has accumulated in the vessel B. When the pointer P indicates the desired amount, the operator closes the faucet E and opens the faucet I, so that the measured liquid in the vessel B can flow through the said faucet I, tube J, and nozzle K into the oil-can or other receptacle designed to receive the measured liquid. It is understood that the float L sinks to the bottom of the vessel B as soon as the amount of liquid has been withdrawn from the said vessel. The vessel B is lowered on the post A from time to time, so as to bring the top of the vessel below the level of the liquid in the tank H. It will be seen that by this device the last drop of liquid from the tank or barrel H can be readily withdrawn and measured in the vessel B above described. It will further be seen that no pump is required to force the liquid from the barrel or tank into the measuring-vessel B.

Having thus described my invention, what I claim as new, and desire to secure by Letters Patent, is—

1. A liquid-measuring device comprising a vessel held vertically adjustable and provided with an inlet and outlet, a float held in the said vessel, and a scale on which the said float is adapted to indicate, substantially as shown and described.

2. In a liquid-measuring device, the combination, with a post, of a vessel held vertically adjustable on the said post, an inlet-faucet held in the bottom of the said vessel and adapted to be connected with a supply tank or barrel, a float held in the said vessel and provided with an upwardly-extending rod carrying a pointer, and a scale on which the said pointer is adapted to indicate, the graduation of the said scale being correspondent with the cubic contents of the said vessel, substantially as shown and described.

3. In a liquid-measuring device, the combination, with a post, of a vessel provided with a central sleeve fitted to slide on the said post, a set-screw for securing the said sleeve to the said post, a faucet arranged in the bottom of the said vessel and adapted to connect with the supply barrel or tank, a float arranged within the said vessel, and the scale adapted to be indicated on by a pointer controlled from the said float, substantially as shown and described.

4. In a liquid-measuring device, the combination, with a post, of a vessel held vertically adjustable on the said post, a discharge-faucet held in the bottom of the said vessel, an inlet-faucet arranged in the bottom of the said vessel and adapted to be connected with the supply tank or barrel, a float arranged within the said vessel and provided with an upwardly-extending rod, a pointer secured on the outer end of the said rod, and a scale supported on the top of the said vessel and adapted to be indicated on by the said pointer, the graduation on the said scale corresponding to the cubic contents of the said vessel, substantially as shown and described.

CHARLES W. PROCTOR.

Witnesses:
HENRY LICHTFELD,
RICHARD E. PROCTOR.